United States Patent
Roche et al.

(10) Patent No.: US 6,793,739 B2
(45) Date of Patent: Sep. 21, 2004

(54) METHOD OF CLEANING AN OZONE GENERATOR

(75) Inventors: François Roche, St. Léonard (CA); J. W. G. Michel Epiney, Duvernay (CA); Robert J. Price, Espanola (CA); Christopher T. Sutton, Sudbury (CA); Gregory E Casey, Humble, TX (US)

(73) Assignee: Air Liquide Canada, Montreal (CA)

( * ) Notice: Subject to any disclaimer, the term of this patent is extended or adjusted under 35 U.S.C. 154(b) by 168 days.

(21) Appl. No.: 09/832,859

(22) Filed: Apr. 12, 2001

(65) Prior Publication Data

US 2002/0148486 A1 Oct. 17, 2002

(30) Foreign Application Priority Data

Apr. 11, 2001 (CA) ............................................. 2343670

(51) Int. Cl.[7] ................................................. B08B 5/00
(52) U.S. Cl. .................. 134/19; 134/22.18; 134/22.12; 134/34; 134/20.18; 134/40; 210/192; 210/760
(58) Field of Search ............................... 134/22.12, 19, 134/34, 20.18, 42

(56) References Cited

U.S. PATENT DOCUMENTS 4,954,321 A * 9/1990 Jensen ................... 422/186.19
5,094,822 A   3/1992 Dunder
5,137,697 A   8/1992 Lathan et al.
5,409,616 A   4/1995 Garbutt et al.
6,039,816 A * 3/2000 Morita et al. ................. 134/19

FOREIGN PATENT DOCUMENTS

JP    03164405    7/1991
JP    07288171   10/1995
JP    11011909    1/1999
JP    11139810    5/1999

OTHER PUBLICATIONS

International Search Report.
Pages from website www.hydroponics.net.au/back-issues//issue36.html, dated Dec. 29, 2000.
Pages from website www.ozonia.com, dated Feb. 15, 2001.

* cited by examiner

Primary Examiner—Zeinab El-Arini
Assistant Examiner—Gentle E Winter
(74) Attorney, Agent, or Firm—Linda K. Russell

(57) ABSTRACT

A cleaning method for removing solid deposits of the oxides of nitrogen, especially dinitrogen pentoxide, from ozone generator tubes and dielectrics is described. The method circulates warm dry gas in the tube section of the generator, warm water in the shell section or both to clean the ozone generator. The oxides are evaporated and evacuated from the system. The method substantially reduces or eliminates the formation of nitric acid on the tubes and dielectrics when the generator is exposed to humidity upon being opened to the atmosphere.

35 Claims, 3 Drawing Sheets

METHOD OF CLEANING AN OZONE GENERATOR

FIELD OF THE INVENTION

The present invention is related to a method for cleaning electrical discharge ozone generators. More particularly, the present invention relates to circulating a warm fluid within the ozone generator to evaporate solid deposits of nitrogen oxides, including dinitrogen pentoxide, from the tubes and dielectrics of the generator.

BACKGROUND TO THE INVENTION

Ozone ($O_3$) is a strong oxidizing agent (2.07V) that is used as a disinfectant in various applications, such as wastewater treatment, cooling towers, air treatment, swimming pool cleaning, food processing, hydroponics, and meat processing. Ozone is particularly effective in aqueous environments. Ozone is, however, very reactive and cannot be stored for any significant period of time. As a result, ozone must be generated at the site where it is to be used. Two common means by which ozone is generated are by subjecting oxygen gas ($O_2$) to ultraviolet radiation or to an electrical discharge.

One type of electrical discharge generator is an electrical barrier discharge ozone generator, commonly known as a silent discharge generator. One such generator is a corona discharge generator. Corona discharge generators are commonly used to generate ozone on a large scale. The basic principle of electrical discharge ozone generators is that a feed gas is fed through a high voltage electrical discharge field between two electrodes. The oxygen is then ionized as it passes through the electrical field which will cause at least some oxygen to be converted to ozone. For corona discharge generators, the feed gas, usually dry air or oxygen, is subjected to coronal discharges created by high voltages between two electrodes, one of which is contained within a dielectric material. In a tubular ozone generator, a dielectric is supported within a tube and a central cathode within the dielectric is subjected to a high voltage relative to an outer anode. The anode is often grounded. High voltage phenomena occur inside the dielectric envelope and induce a corona discharge field between the outside of the dielectric envelope (hereinafter referred to as "dielectric") and the outer anode material. An oxygen-containing feed gas is fed into this space and through this field, and the oxygen ($O_2$) molecules are split to form atomic oxygen, which then reacts to form ozone.

$3O_2 + \text{Energy} \rightarrow 2O_3$ (Eq. 1)

The quantity of ozone generated depends on several factors, such as for example the voltage, the frequency of AC current, the gap between the dielectric and the cathode and the concentration of $O_2$ and other gases in the feed gas. The feed gas may be dry, clean air; dry, clean oxygen; or dry, clean oxygen containing small amounts of other relatively inert gases such as nitrogen ($N_2$) or argon (Ar). It is important that dry feed gas be used, as water interferes with the reaction and also reacts with gases in the ozone gas to create contaminants, most notably nitric acid ($HNO_3$).

Much of the energy required for the reaction is lost as heat; therefore ozone generators should be cooled to operate more efficiently. One of the ways that cooling the generator increases the efficiency of the generator is by causing fewer $O_3$ molecules to be lost due to decomposition or collision. A good description of ozone generating equipment can be found in U.S. Pat. No. 4,954,321 by Jensen issued Sep. 4, 1990, and also in "Ozone Technology and Equipment Design", Ozonia North America, USA 1996, the information in, and contents of, both documents hereby being incorporated herein by reference.

Large amounts of ozone are not easily generated. For example, an ozone generation system employing an electrical discharge and which uses liquid oxygen at $\geq 99.5\%$ purity, that has been vaporized and has had between 2 and 3% $N_2$ by weight and a certain amount of argon added, will typically produce 10–13% ozone by weight. Because of the relatively low rate of ozone generation, large plants may require several ozone generators to meet the demand for ozone. In turn, each generator may contain many anode/cathode/dielectric units.

As noted above, the amount of ozone generated depends on several factors, one of which is the amount of $N_2$ in the feed gas. When oxygen separated from air is used as a feed gas, nitrogen may be present. This is because of the method used to separate the oxygen from the air, e.g. vacuum or pressure swing adsorption or cryogenic separation. Nitrogen may also be present in the feed gas because it has been introduced to act as a catalyst. Nitrogen allows production of a higher ozone concentration or the reduction of the power consumed in generating the ozone. For example, large commercial ozone generators using pure oxygen generally create between 6–10% ozone by weight, instead of the 10–13% available when a small amount of $N_2$ is added. It is therefore not desirable to remove all of the $N_2$.

Unfortunately, it has been discovered that the presence of nitrogen in the feed gas results in a solid residue, mainly composed of dinitrogen pentoxide ($N_2O_5$), with some of it being deposited within the generator system, including on the tubes and the dielectrics. The residue may also contain other solid oxides of nitrogen ($NO_x$). The oxide deposits on the support tubes and dielectrics and may eventually clog the passageway between the dielectric and the support tube.

Regular maintenance of ozone generators typically involves an inspection and repair of the electrical connections. However, because of the problems inherent in cleaning the generators described in greater detail below, opening the ozone generator to the atmosphere is avoided whenever possible. From time to time, however, ozone generators may require special or preventative maintenance. Such maintenance may be occasioned by failure of more than approximately 10% of the dielectrics or by deposits that clog the passages between the dielectrics and their support tubes in some systems.

Current methods of cleaning ozone generators consist of turning off the power supply and cooling water and purging the generator by circulating dry oxygen gas at room temperature through the system. The purging continues until the residual ozone has been removed from the inside of the generator for the safety of the workers. Thereafter the system is opened up to the atmosphere.

When the ozone generator is opened for regular maintenance, if it is opened for long enough, the water in the ambient air reacts with any residual solid nitrogen oxides to form nitric acid ($HNO_3$). The reaction with $N_2O_5$ for example, proceeds as follows:

$H_2O + N_2O_5 \rightarrow 2HNO_3$ (Eq. 2)

Nitric acid is an oily, yellow residue, and any nitric acid in the generator needs to be removed.

The cleaning typically requires that all dielectrics and the tubes holding them be cleaned with a proper solvent. Generally, the dielectrics and tubes are removed from the system, cleaned with water and then with an industrial organic solvent such as acetone or a chlorinated organic solvent such as perchloroethylene, or methanol. This cleaning work is time consuming, and may require more than 14 days for an industrial scale ozone generator. In addition, removal and cleaning of the dielectrics will result in some breakage (perhaps 10%), thereby requiring their replacement. Finally, the chlorine containing solvents and the disposal of the contaminated cleaning solvents represent additional cost and safety issues that must be considered.

It is therefore desirable to have a less onerous cleaning method that would decrease the time and expense required for special maintenance of electrical discharge ozone generators, particularly large-scale corona discharge ozone generators.

SUMMARY OF THE INVENTION

The current invention relates to a method of removing solid deposits of the oxides of nitrogen, including in particular dinitrogen pentoxide, in an ozone generator thereby avoiding the need to open the generator to atmosphere. If it is necessary to open the generator, to replace dielectrics for example, the inventive method will significantly reduce or eliminate the creation of nitric acid residue within the system. The inventive method can significantly reduce the maintenance time required from perhaps two to three weeks for each generator to perhaps as little as three days. In addition, damage to the dielectrics is minimized or eliminated, as is the need for solvents to remove the nitric acid. The method can provide significant costs savings in personnel time and materials.

A preferred embodiment of the inventive method uses warm gas circulation, preferably at 47–65° C., within the generator dielectric support tubes and warm water circulation in the shell section of the generator, preferably at 47–65° C. If the physical components of the generator can withstand temperatures above 65° C. then the temperature of the gas can be increased well above 65° C., although this is not necessary to remove dinitrogen pentoxide, and heating the gas to a higher temperature may make the cleaning process more expensive. The fluid circulation within the system raises the temperature within the generator, and various solid oxides of nitrogen, which have boiling points less than the temperature of the circulated gas, including dinitrogen pentoxide which has a boiling point of about 47° C., are evaporated and thereafter evacuated from the system by the gas stream. The temperature within the generator is sufficient to ensure that the deposits do not re-form within the ozone generator.

The progress of the cleaning can be monitored by bubbling a portion of the evacuated gas through a water trap and measuring the change in pH caused by the $HNO_3$ formed by interaction of the $NO_x$ and the water. Fluids are circulated within the generator until the pH of the water used as a reference is not appreciably lowered by the gas exiting the tubes of the generator.

If the need for maintenance was caused only by a build-up of $NO_x$, including in particular $N_2O_5$, the system is ready to return to production without requiring the generator to be opened to the atmosphere. Cleaning time and potential contamination are reduced. If the maintenance was required because of damaged dielectrics, when the system is opened to ambient air after being sufficiently cleaned, no nitric acid is formed. Only those dielectrics requiring replacement need be removed and replaced. Again, there are significant benefits in terms of both time and material savings.

In one aspect of the invention there is provided a method of cleaning an electrical discharge ozone generator comprising passing a warm cleaning gas between an inlet of the generator and an outlet of the generator to evaporate at least some of the $NO_x$ deposited in the ozone generator.

In another aspect of the invention there is provided a method for removing solid deposits of $NO_x$ from an ozone generator comprising a first and second electrode, the electrodes being spaced from each other and having a passageway therebetween. The solid deposits of $NO_x$ are located within the passageway. The method comprises the step (i) of passing a warm cleaning gas through the passageway to evaporate the solid deposits of $NO_x$ with boiling points equal to or less than 65° C. which are deposited therein. The warm cleaning gas exiting the ozone generator is at a temperature sufficient to maintain the $NO_x$ in a gaseous state until the $NO_x$ exits the ozone generator.

In another aspect of the invention there is provided a method for removing solid deposits of $NO_x$ from an ozone generator comprising a housing enclosing an interior having an inlet and an outlet and a pair of spaced electrodes mounted within the interior. The electrodes are spaced apart from each other. The solid deposits of $NO_x$ are located within the interior. The method comprises the step of passing a warm cleaning gas through the interior from the inlet to the outlet to evaporate at least some of the $NO_x$ deposited therein. The warm cleaning gas exits the ozone generator at a temperature sufficient to maintain the $NO_x$ in a gaseous state until the $NO_x$ exits the ozone generator.

In a further aspect of the invention there is provided a method for removing solid deposits of $NO_x$ from an ozone generator comprising a housing and a plurality of support tubes mounted within the housing. The support tubes each support one or more dielectrics and each of the support tubes has an inner wall. A passageway is formed between the inner wall of the support tubes and the dielectrics. The passageway has solid deposits of $NO_x$ therein. A support tube inlet is in flow communication with a support tube outlet through the passageway. The method comprises the step (i) of passing a warm cleaning gas through the passageway to evaporate at least some of the solid deposits of $NO_x$ which are deposited therein and carry at least some of the evaporated $NO_x$ from the ozone generator.

In another aspect of the invention there is provided a method for removing solid deposits of $NO_x$ from an ozone generator comprising an outer housing and a plurality of support tubes mounted within the housing. The support tubes each support one or more dielectrics and each of the support tubes has an inner wall and a passageway between the inner wall and the dielectrics. The passageway communicates between a support tube inlet and a support tube outlet. The housing has a shell that defines an interior surrounding the support tubes, the interior communicates between a shell inlet and a shell outlet. The method comprises step (i) of circulating a warm fluid within the shell and the concurrent step (ii) of evacuating the support tubes to remove the evaporated $NO_x$ with boiling points less than 65° C. that had been deposited therein.

In a further aspect of the invention there is provided a method for removing solid deposits of $NO_x$ from an ozone generator comprising an outer housing and a plurality of support tubes mounted within the housing. The support tubes each support one or more dielectrics and each of the support tubes has an inner wall and a passageway between the inner wall and the one or more dielectrics. The passageway communicates between a support tube inlet and a support tube outlet. The housing has a shell that defines an interior surrounding the support tubes. The interior communicates between a shell inlet and a shell outlet. The method comprises step (i) of circulating a cleaning gas within the support tubes and concurrent step (ii) of circulating a warm fluid within the shell to heat the cleaning gas, thereby removing the $NO_x$ with boiling points less than 65° C. deposited therein. The temperature of the warm fluid is sufficient to ensure that the temperature of the cleaning gas exiting the ozone generator is sufficient to maintain the $NO_x$ in a gaseous state until the $NO_x$ exits said ozone generator.

In yet another aspect of the invention there is provided a method for removing dinitrogen pentoxide deposits from an ozone generator comprising an outer housing and a plurality of support tubes mounted within the housing. The support tubes each support one or more dielectrics and each support tube has an inner wall and a passageway between the inner wall and the dielectrics. The passageway communicates between a support tube inlet and a support tube outlet. A shell surrounds the support tubes, the shell defining an interior surrounding the support tubes. The interior communicates between a shell inlet and a shell outlet. The method comprises circulating a clean, dry mixture of oxygen, nitrogen and argon at 55° C.–60° C. between the shell inlet and shell outlet; supplying the shell with warm water at 55° C.–60° C.; diverting a portion of the gas exiting the support tubes to a liquid ring compressor; adding a neutralizing agent to the water in the compressor to maintain the pH in the liquid ring compressor at an approximately constant pH using an in-line process pH controller; and continuing the cleaning until the addition of neutralizing agent terminates as it is no longer required to maintain the constant pH.

Other aspects and features of the present invention will become apparent to those ordinarily skilled in the art upon review of the following description of specific, preferred embodiments of the invention in conjunction with the accompanying figures.

DETAILED DESCRIPTION OF THE PREFERRED EMBODIMENTS

Figure 1:
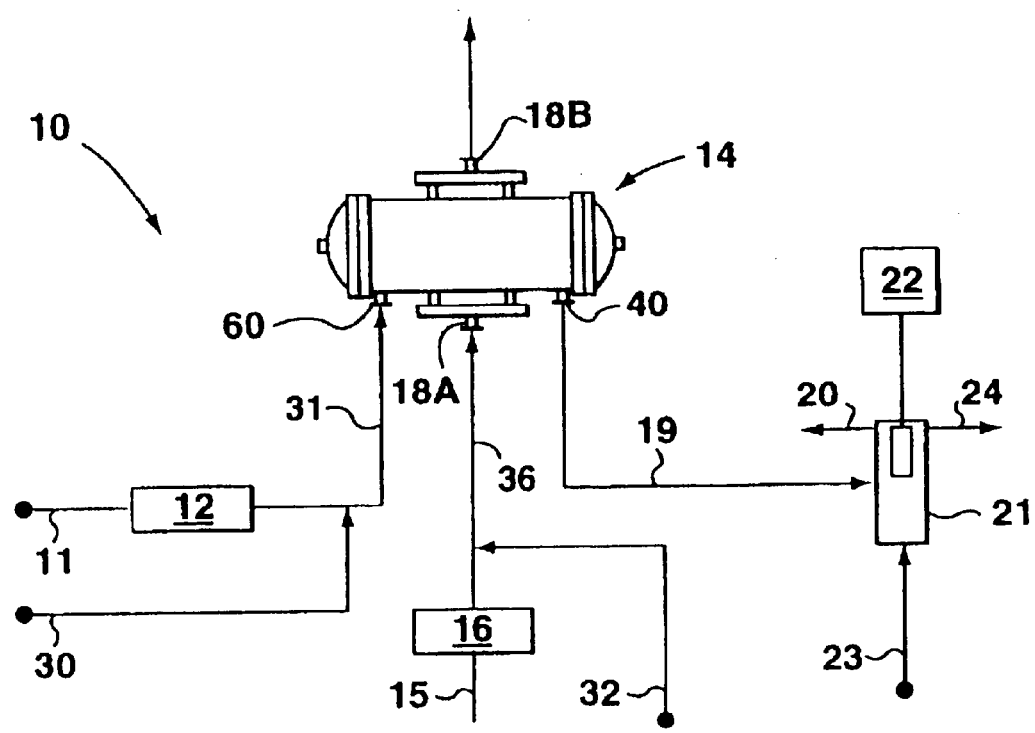
FIG. 1 is a schematic representation of a ozone generating system having an ozone geneator which can be cleaned using a method in accordance with an embodiment of the invention.
Figure 2:
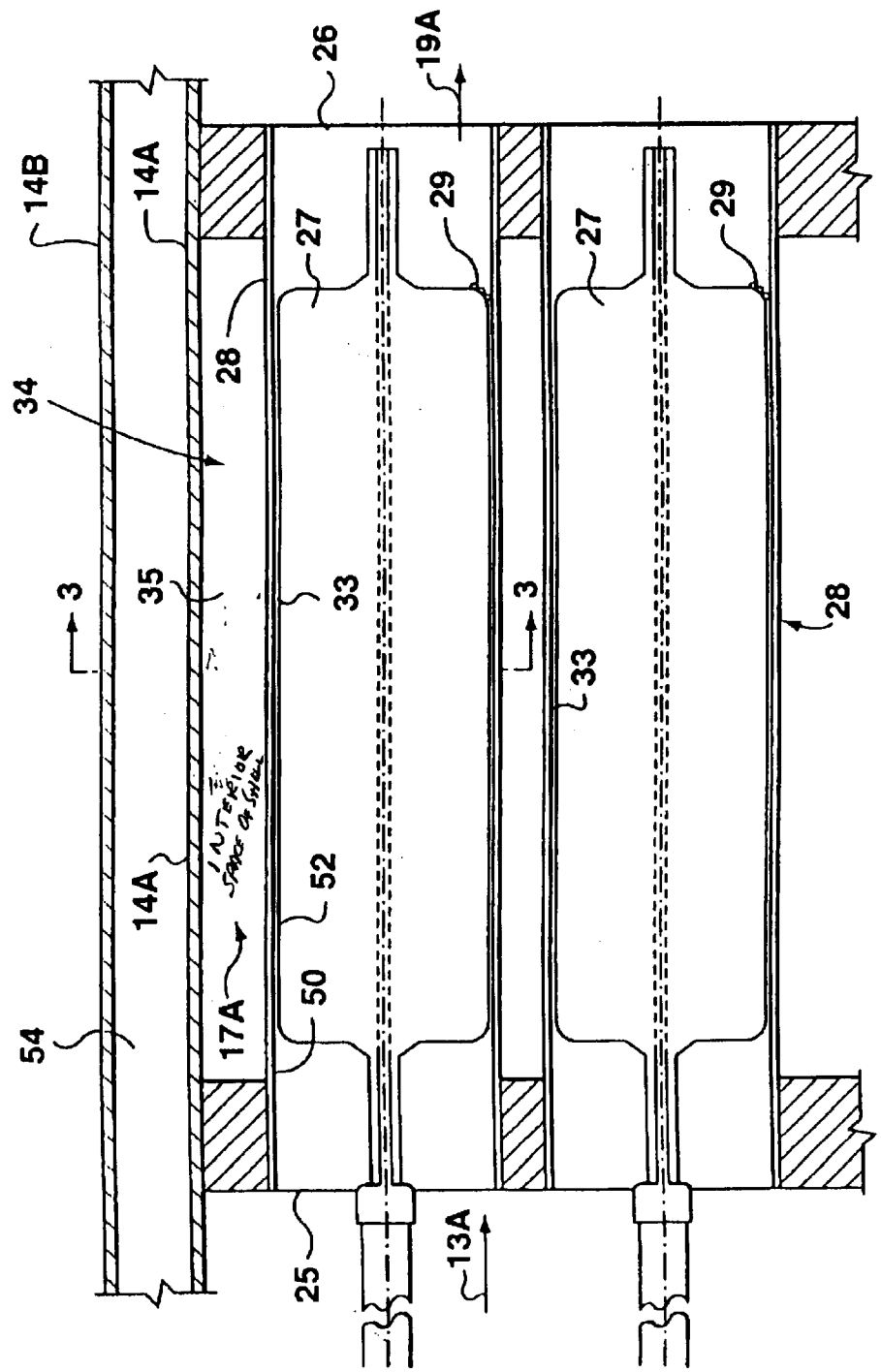
FIG. 2 is a cross-sectional view of part of an ozone generator, that can be cleaned using an embodiment of the inventive method.
Figure 3:
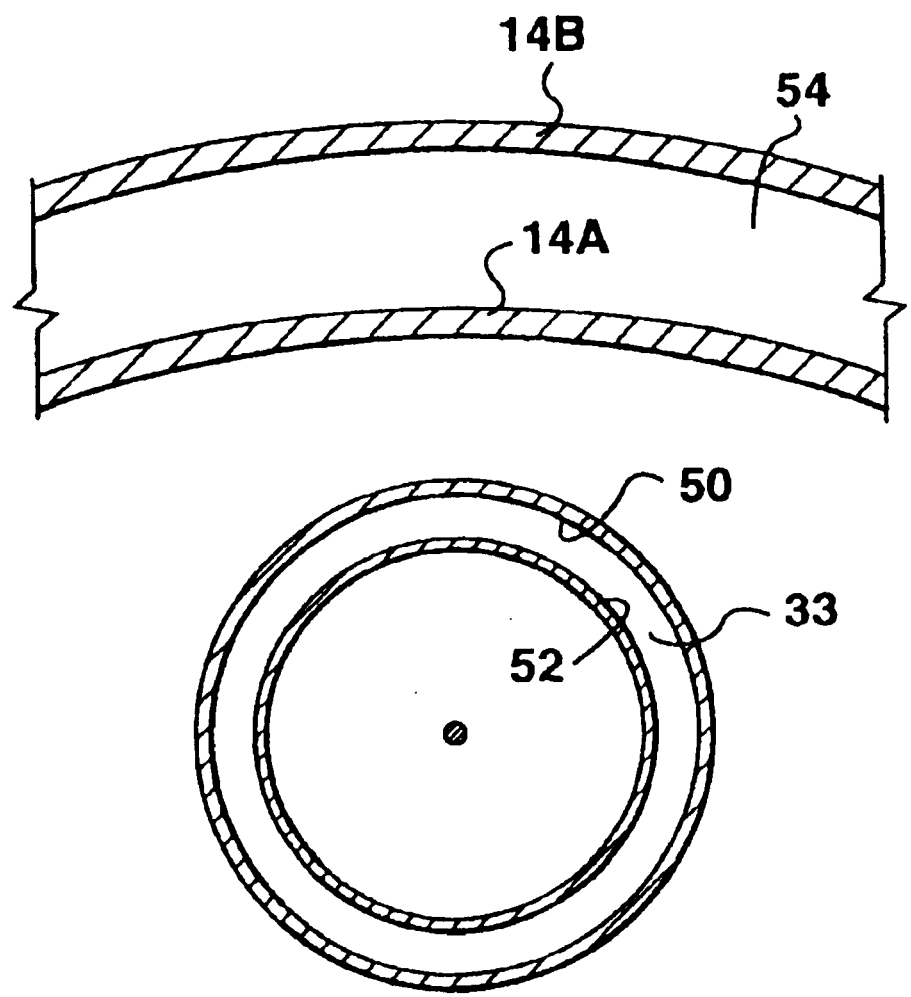
FIG. 3 is a cross-sectional view at 3—3 of FIG. 2.

With reference to FIGS. 1, 2 and 3, an ozone generator system 10 is illustrated which includes an ozone generator 14. It will be appreciated that FIGS. 2 and 3 show only part of an ozone generator. Typically such electrical discharge generators employ numerous dielectric support tubes through which oxygen is passed during the ozone generation process.

In the Figures, generator 14 has a housing formed from a shell 14A. In this case, it is shown in FIGS. 1 and 2 with a jacket 14B surrounding shell 14A, although a jacket is not typically employed in commercial generators. Between shell 14A and jacket 14B is a jacket passageway 54. The jacket 14B has an inlet (not shown) which is in flow communication with an outlet (not shown) through passageway 54. Shell 14A houses a plurality of dielectric support tubes 28 which are mounted on supports within the interior 34 of shell 14A. Between the support tubes in interior 34 is an interior space 35 which surrounds the support tubes. Each support tube 28 houses one or more dielectrics 27. Each tube 28 has an inlet 25 which is in flow communication with an outlet 26 through a passageway 33 which is provided between the inner wall 50 of the support tube 28 and the outer wall 52 of the dielectrics 27. In operation to make ozone, ozone is created in the corona electrical discharge immediately outside or around dielectric 27. During the production of ozone, deposits 29 of nitrogen oxides, especially $N_2O_5$, may build up on the dielectric 27 and the inner wall support tube 28.

The system 10 also provides for cool water to flow through the interior space 35 of generator shell 14A around the tubes 28. During operation of system 10 to produce ozone, the flowing water will cool generator 14, thereby increasing the efficiency of ozone production. The flow of water 17A enters inlet (shown schematically as 18A) of shell 14A via conduit 36 and exits at outlet (shown schematically 18B). The water fills interior space 35, which as described above generally comprises the portion of interior 34 of the housing not filled by support tubes 28. However, when used in the inventive method of cleaning, the water flowing through interior space 35 is warm and may be provided by water source 15 and heated at heater 16 or water may be provided by a source of warm water 32.

Also, during operation of system 10 to produce ozone, gas enters the ozone generator 14 at inlet 60 through conduit 31 (FIG. 1), and then the gas flow divides within the generator 14 so that a portion of the total gas flow will flow through each of the passageways between the inlets and outlets of each support tube. At the outlets 26 of each support tube 28, the separate flows re-unite and then exit the generator at a common outlet 40. Providing a positive flow of gas is also preferred in practicing the inventive method. Thus during the cleaning process, a flow of gas 13A enters support tubes 28 at each inlet 25 and exits at each outlet 26. The cleaning gas may be provided by gas source 11 and heated at heater 12 or gas may be provided by gas source 30, which is already heated. After travelling through support tubes 28, the cleaning gas exits shell 14A via outlet 40 and may enter a water trap 21 via conduit 19. A portion of the cleaning gas that exits outlet 40 is diverted to outlet 20. Water trap 21 is provided with a source of reference water 23, and a pH monitor 22. Water exits water trap 21 through exit 24.

When ozone production is stopped at installation 10 to undertake special maintenance, occasioned, for example, by the support tubes 28 being plugged, such as by solid deposits of $N_2O_5$ and perhaps other solid oxides of nitrogen in passageway 33 or by too many of the dielectrics 27 being damaged, the system is first purged of all $O_3$. This can be done, for example, by using the feed gas generally used to create ozone or by using industrial grade oxygen. The gas is fed through support tubes 28 while no electric discharge is present.

With reference to FIGS. 1–3, after purging the generator of ozone, in one embodiment of the invention, the inside of generator 14 where the dielectrics 27 and support tubes 28 are located is supplied through inlet 25 with a warm cleaning gas. The cleaning gas may be any dry, clean gas that is compatible with the ozone generator system, such as oxygen; nitrogen; a mixture of nitrogen and oxygen that may contain argon; or industrial grade helium, argon, air or possibly even carbon dioxide ($CO_2$), although the latter will have the effect of lowering the pH to 7.0–8.0. It may be most convenient to utilize oxygen since that is the gas used in the ozone generating process. The cleaning gas must be dry, sufficiently contaminant-free and compatible with a system used for generating ozone, i.e. it should not detrimentally affect the physical system or interfere with production of ozone when the system is returned to production. Any such gas should be dry or substantially dry. In this embodiment, the cleaning gas evaporates and entrains the $NO_x$ 29 deposited on the dielectrics 27 and support tubes 28.

Herein, the term "cleaning gas", when used in this specification and claims includes any of the cleaning gases described thus far in the specification, and any other suitable gases.

In one preferred embodiment, the cleaning gas 11 is circulated into inlet 25 via conduit 31 and inlet 60 after heating at heat source 12 which may be any conventional heat source, for example, a water bath, or an electrical or steam heater. In another preferred embodiment, a source of hot gas 30 may also be used. The gas enters the support tube 28 at inlet 25 at a temperature of preferably between 47–65° C. and most preferably 55–60° C. The cleaning gas exits support tube 28 at outlet 26. Cleaning gas is circulated through the system 10 until the solid deposits of $NO_x$ that have boiling points of about 65° C. or less, including in particular $N_2O_5$, have been substantially removed from the ozone generator.

The temperature of the warm gas 19A that exits tube 28, and later outlet 40, is preferably between 47–65° C. to ensure that the evaporated $NO_x$ does not re-deposit as solids within the ozone generator. While not strictly necessary, it is good practice to ensure that $NO_x$ also does not re-deposit within conduit 19.

In the same preferred embodiments, while the gas is circulating in tube 28, water is circulated in the interior 34 of generator shell 14A. In one such preferred embodiment, the circulating water 15 is heated before entering the interior space 35 of shell 14A via conduit 36 and inlet 18A using a conventional heat source 16. As stated above, the heat source may, for example, be a water bath or an electrical or steam heater. In another embodiment, a source of warm water 32 is used. The water enters interior space 35 at inlet 18A at a temperature of between 29–65° C., preferably between 47–65° C. and most preferably between 55–60° C. and exits at outlet 18B at a temperature sufficient to ensure that, in combination with the cleaning gas temperature, the evaporated $NO_x$ remains in a gaseous state until it exits outlet 40.

While water circulation is preferred, it is not necessary. In most applications, gas circulation alone, should normally be sufficient to clean the system of the $NO_x$ deposits as long as the temperature reached inside the support tubes is sufficient to evaporate the $NO_x$ 29, as the gas passes over the $NO_x$ solids 29 and maintain the $NO_x$ in a gaseous state until the $NO_x$ exits the generator 14. It will also be appreciated that, at relatively high flow rates of cleaning gas, the $NO_x$ solids may be evaporated at a temperature that is significantly below their boiling points due to the vapor pressure effects.

In yet a further embodiment, the gas 13A or water 17A may be heated after entering the generator 14 by causing the generator itself to be heated. Such heating may take many forms, such as for example by applying a heat source directly to the outside of shell 14A or by circulating hot water or steam through a jacket 14B mounted on the outside of shell 14A, as long as the generator can withstand such heating.

Additionally, in a further embodiment of the invention there is no need to heat the cleaning gas directly if the temperature and the effect of the fluids circulating in interior space 35 or jacket 14B has a sufficient effect on heating the cleaning gas, that the cleaning gas can evaporate substantially all of the deposited $NO_x$ 29 and maintain the $NO_x$ in a gaseous state until it exits the generator 14 at outlet 40.

Additionally, it may also possible to remove the deposits of $NO_x$ 29 using water circulation only in generator shell 14A, as long as the temperature inside the support tubes 28 of the generator 14 is sufficient to evaporate the $NO_x$ deposit 29. However, if this embodiment of the invention is used, a means for creating a flow of gas out of support tube 28, such as a vacuum pump will be required. In that case, the ozone generator used must be rated to withstand the physical stresses that may result.

If warm water is used, it exits generator shell 14A at outlet 18B. The water exiting generator shell 14A has a temperature of preferably between 47–65° C. The water may be discharged in an environmentally safe manner or it may be re-circulated to inlet 32 if it is still warm although more likely it would be returned to inlet 15 and reheated prior to re-circulation through the generator.

In a further embodiment of the invention, at least a portion of the cleaning gas exiting support tube 28 through outlet 26 enters a water trap 21 via conduit 19. The pH of the water in water trap 21 is monitored continuously or manually by a pH meter 22. The water trap 21 may be any one of several water containers such as a barrel, a tank or a liquid ring compressor, as long as it is sufficiently stable to withstand the expected gas flow into the water. The liquid ring compressor uses an elliptical liquid ring around an impeller to compress the ozone gas. As the ozone is compressed, it gives off heat, but this heat is absorbed by the ring of water. This water is continuously re-circulated through the compressor and through a heat exchanger to cool the water.

The majority of the gas exits outlet 20 in front of water trap 21 to an approved scrubbing or capture system.

If $NO_x$ 29, including in particular $N_2O_5$, is present, it will react with reference water 23 flowing into the trap 21 and form nitric acid, thereby reducing the pH 24 of the water in the trap 21 below that of the incoming reference water 23.

The reference water 23 is fed into the trap 21 continuously at a certain flow rate, which will depend on the particular system being cleaned, sufficient to record an appreciable pH change at the beginning of the cleaning cycle when the cleaning gas and warm water are at the proper temperature. The value of the appreciable pH change will depend on the pH monitoring system being used. The pH may also be monitored manually. The value of the pH drop can be approximately 3 pH units. The water trap 21 may be any size. The pH is allowed to vary and is monitored. When the monitored pH returns to the same pH as the incoming water, and stays constant, the cleaning will have been completed.

In the preferred embodiment, the existing installation liquid ring compressor 21 and in-line pH control system, which includes a pH meter, are used to monitor the pH 24 of the water containing gas from conduit 19. When a compressor is used, it is not desirable to allow the pH to vary significantly as that might damage the compressor. Therefore, the method employed is that when the cleaning first begins, the pH of the reference water 23 in the liquid ring compressor 21 will start to drop. In response, the in-line pH control system starts to add a neutralizing agent, for example, trisodium phosphate (TSP), to maintain the pH at a substantially stable level. Thus the presence of nitric acid can be ascertained by whether or not the neutralizing agent is continuing to be added. When the addition of the neutralizing agent stops, (i.e. no neutralizing agent is needed because the incoming gas no longer contains significant amounts of $NO_x$ and therefore no nitric acid is formed) the cleaning is complete.

The circulation of warm gas 13A and/or warm water 17A is maintained until substantially all $NO_x$ 29 with boiling points less than 65° C., especially $N_2O_5$, have been removed from support tube 28 and dielectric 27 of the generator. Typically, this is when there is no longer an appreciable difference in pH between the pH 24 of the water exiting the trap 21 and the pH of the reference water 23 entering the trap 21, if no pH adjustment is applied.

It will be appreciated by those skilled in the art, however, that pH monitoring, or more generally monitoring for the presence of $NO_x$ in the cleaning gas, is not necessary for the generator cleaning to be effectual. The cleaning may also be carried out for particular periods of time for which it is known that sufficient cleaning will have occurred, rather than monitoring. However, monitoring will clearly be a more accurate way of ensuring that the generator has been cleaned sufficiently.

It will be appreciated by those skilled in the art that while water has been used to describe the above embodiments, other fluids including gases may be used within interior 34 and jacket 14B as long as they are compatible with the physical characteristics of the ozone generator being used.

The aforementioned temperature ranges are influenced by the physical characteristics, including partially the boiling points of the $NO_x$ 29, and the physical limits of the particular generator used. The upper temperature limit of 65° C. may be increased in generators that are constructed to withstand elevated temperatures. The upper limit of the temperature range is then dictated by other concerns such as safety concerns.

In the preferred embodiment, the $O_3$ is purged from the system before the generator cleaning process is started. However, if the ozone generating plant has available means of disposing of water contaminated with $O_3$, the cleaning procedure can be commenced without first performing the $O_3$ purge.

The foregoing description is necessarily described with reference to the preferred embodiments of the inventive method applied to a particular ozone generator system but of course, the method may also be applied to other ozone generating apparatus. For example, the ozone generator may consist of spaced apart electrodes that are electrode plates and that have a passageway therebetween. While a plurality of embodiments of this invention has been illustrated in the accompanying drawings and described above, it will also be evident to those skilled in the art that changes and modifications may be made therein without departing from the invention. All such modifications or variations are considered to be within the scope of the invention as defined by the claims appended hereto.

What is claimed is:

1. A method for removing solid deposits of $NO_x$ from an ozone generator; said generator comprising:
   (a) a first and second electrode, said electrodes being spaced from each other and having a passageway therebetween;
   (b) said solid deposits of $NO_x$ located within said passageway;
   said method comprising the step of (i) ceasing the production of ozone in the ozone generator; (ii) passing a warm cleaning gas through said passageway to evaporate said solid deposits of $NO_x$ with boiling points equal to or less than 65° C. which are deposited therein; said warm cleaning gas exiting said ozone generator at a temperature sufficient to maintain the $NO_x$ in a gaseous state until said $NO_x$ exits said ozone generator.

2. A method for removing solid deposits of $NO_x$ from an ozone generator, said generator comprising:
   a) a housing enclosing an interior having an inlet and an outlet;
   b) a pair of spaced electrodes mounted within said interior, said electrodes being spaced from each other;
   c) solid deposits of $NO_x$ located within said interior;
   said method comprising step of (i) ceasing the production of ozone in the ozone generator (ii) passing a warm cleaning gas through said interior from said inlet to said outlet to evaporate at least some of the $NO_x$ deposited therein; said warm cleaning gas exiting said ozone generator at a temperature sufficient to maintain the $NO_x$ in a gaseous state until said $NO_x$ exits said ozone generator.

3. A method for removing solid deposits of $NO_x$ from an ozone generator, said generator comprising:
   a) a housing and a plurality of support tubes mounted within said housing;
   b) said support tubes each supporting therein one or more dielectrics;
   c) each of said support tubes having an inner wall and whereby a passageway is formed between said inner wall of said support tubes and said one or more dielectrics; said passageway having solid deposits of $NO_x$ therein;
   d) a support tube inlet in flow communication with a support tube outlet through said passageway,
   said method comprising the step of (i) ceasing the supply of electrical power to said electrodes to cease the production of ozone in the ozone generator; (ii) passing a warm cleaning gas through said passageway to evaporate at least some of said solid deposits of $NO_x$ which are deposited therein and carry at least some of the evaporated $NO_x$ from the ozone generator.

4. A method as claimed in claim 1 wherein said $NO_x$ includes $N_2O_5$.

5. A method as claimed in claim 2 wherein said $NO_x$ includes $N_2O_5$.

6. A method as claimed in claim 3 wherein said $NO_x$ includes $N_2O_5$.

7. A method as claimed in claim 6 wherein said cleaning gas is heated to between 47° C. to 65° C. before it reaches each said support tube inlet.

8. A method as claimed in claim 7 wherein the flow of said cleaning gas through each said support tube is such that the temperature of said cleaning gas exiting at each said support tube outlet is between 47° C. and 65° C.

9. A method as claimed in claim 6 wherein said cleaning gas is heated to between 55° C. to 60° C. before it reaches said support tube inlet, and the flow of said cleaning gas through said support tube is such that the temperature of said cleaning gas exiting said support tube outlet is between 50° C. and 55° C.

10. A method as claimed in claim 6 wherein said housing has a shell; said shell defining an interior in which said support tubes are supported in spaced relation to each other; said interior having an interior space between said support tubes; said interior space having an inlet and an outlet and comprising a step (ii) of heating said shell directly whereby as said gas passes through said support tubes said gas is heated by said shell.

11. A method as claimed in claim 6 wherein said housing has a shell; said shell defining an interior in which said support tubes are supported in spaced relation to each other; said interior having an interior space between said support tubes; said interior space having an inlet and an outlet and comprising a step (ii) of passing a heated fluid in said interior space from said shell inlet to said shell outlet.

12. A method as claimed in claim 11 wherein said fluid is water.

13. A method as claimed in claim 12 wherein said water is at a temperature greater than 47° C. in said interior space.

14. A method as claimed in claim 12 wherein said water is heated before entering said interior space at said shell inlet to between 47° C. and 65° C. and the temperature of said water flowing through said shell is between 47° C. and 65° C.

15. A method as claimed in claim 12 wherein said water is heated before said shell inlet to between 55° C. and 60° C. and the temperature of said water flowing through said shell is between 47° C. and 65° C.

16. A method as claimed in claim 11 wherein said housing has a jacket surrounding said shell; said jacket having an inner wall and a second passageway between said shell and said inner wall of said jacket; said second passageway communicating between a jacket inlet and a jacket outlet and comprising step (iii) of circulating a warm fluid through said second passageway of said jacket.

17. A method for removing solid deposits of $NO_x$ from an ozone generator, said generator comprising:
  a) an outer housing and a plurality of support tubes mounted within said housing and;
  b) said support tubes each supporting therein one or more dielectrics;
  c) each of said support tubes having an inner wall and a passageway between said inner wall and said one or more dielectrics;
  d) said passageway communicating between a support tube inlet and a support tube outlet; and
  e) wherein said housing has a shell; said shell defining an interior surrounding said support tubes; said interior communicating between a shell inlet and a shell outlet;
  f) said method comprising step (i) of circulating a warm fluid within said shell and the concurrent step (ii) of evacuating said support tubes to remove the evaporated $NO_x$ with boiling points less than 65° C. that had been deposited therein.

18. A method for removing solid deposits of $NO_x$ from an ozone generator, said generator comprising:
  a) an outer housing and a plurality of support tubes mounted within said housing and;
  b) said support tubes each supporting therein one or more dielectrics;
  c) each of said support tubes having an inner wall and a passageway between said inner wall and said one or more dielectrics;
  d) said passageway communicating between a support tube inlet and a support tube outlet; and
  e) wherein said housing has a shell; said shell defining an interior surrounding said support tubes; said interior communicating between a shell inlet and a shell outlet;
  f) said method comprising the step of circulating a cleaning gas through said support tubes and the concurrent step (ii) of circulating a warm fluid within said shell to heat said cleaning gas, thereby removing the $NO_x$ with boiling points less than 65° C. deposited therein; wherein the temperature of said warm fluid is sufficient to ensure that the temperature of said cleaning gas exiting said ozone generator is sufficient to maintain said $NO_x$ in a gaseous state until said $NO_x$ exits said ozone generator.

19. A method for removing solid deposits of $NO_x$ from an ozone generator; said generator comprising:
  (a) a first and second electrode, said electrodes being spaced from each other and having a passageway therebetween;
  (b) said solid deposits of $NO_x$ located within said passageway said method comprising the steps of (i) passing a warm cleaning gas through said passageway to evaporate said solid deposits of $NO_x$ with boiling points equal to or less than 65° C. which are deposited therein; said warm cleaning gas exiting said ozone generator at a temperature sufficient to maintain the $NO_x$ in a gaseous state until said $NO_x$ exits said ozone generator and (ii) diverting a sufficient portion of said cleaning gas to a water trap and monitoring the pH within the water trap.

20. A method for removing solid deposits of $NO_x$ from an ozone generator, said generator comprising:
  a) a housing enclosed an interior having an inlet and an outlet;
  b) a pair of spaced electrodes mounted within said interior, said electrodes being spaced from each other;
  c) solid deposits of $NO_x$ located within said interior; said method comprising steps of (i) passing a warm cleaning gas through said interior from said inlet to said outlet to evaporate at least some of the $NO_x$ deposited therein; said warm cleaning gas exiting said ozone generator at a temperature sufficient to maintain the $NO_x$ in a gaseous state until said $NO_x$ exits said ozone generator and (ii) diverting a sufficient portion of said cleaning gas to a water trap and monitoring the pH in the water trap.

21. A method for removing solid deposits of $NO_x$ from an ozone generator, said generator comprising:
  (a) a housing and a plurality of support tubes mounted within said housing;
  (b) said support tubes each supporting therein one or more dielectrics;
  (c) each of said support tubes having an inner wall and whereby, a passageway is formed between said inner wall of said support tubes and said one or more dielectrics; said passageway having solid deposits of $NO_x$ therein;
  (d) a support tube inlet in flow communication with a support tube outlet through said passageway;
  said method comprising the steps of (i) passing a warm cleaning gas through said passageway to evaporate at least some of said solid deposits of $NO_x$ which are deposited therein and carry at least some of the evaporated $NO_x$ from the ozone generator and diverting a sufficient portion of said cleaning gas to a water trap and monitoring the pH in the water trap.

22. A method as claimed in claim 1 wherein said cleaning gas consists substantially of oxygen gas.

23. A method as claimed in claim 2 wherein said cleaning gas consists substantially of oxygen gas.

24. A method as claimed in claim 3 wherein said cleaning gas consists substantially of oxygen gas.

25. A method as claimed in claim 19 comprising a further step (iii) of adding a neutralizing agent to maintain an approximately constant pH in said water trap which has received a sufficient portion of said cleaning gas exiting said ozone generator, and whereby when the adding of said neutralizing agent over a period of time has stopped, it can be determined that said cleaning of said ozone generator has been completed.

26. A method as claimed in claim 20 comprising a further step (iii) of adding a neutralizing agent to maintain an approximately constant pH in said water trap which has received a sufficient portion of said cleaning gas exiting said ozone generator, and whereby when the adding of said neutralizing agent over a period of time has stopped, it can be determined that said cleaning of said ozone generator has been completed.

27. A method as claimed in claim 21 comprising a further step (iii) of adding a neutralizing agent to maintain an approximately constant pH in said water trap which has received a sufficient portion of said cleaning gas exiting said ozone generator, and whereby when the adding of said neutralizing agent over a period of time has stopped, it can be determined that said cleaning of said ozone generator has been completed.

28. A method for removing solid deposits of $NO_x$ from an ozone generator, said generator comprising:
   (a) a housing and a plurality of support tubes mounted within said housing;
   (b) said support tubes each supporting therein one or more dielectrics: (c) each of said support tubes having an inner wall and whereby a passageway is formed between said inner wall of said support tubes and said one or more dielectrics; said passageway having solid deposits of $NO_x$ therein; (d) a support tube inlet in flow communication with a support tube outlet through said passageway;
   said method comprising the steps of (i) passing a warm cleaning gas through said passageway to evaporate at least some of said solid deposits of $NO_x$ which are deposited therein and carry at least some of the evaporated $N_x$ from the ozone generator and (ii) diverting sufficient portion of said cleaning gas to a water trap to create a measurable change in pH from an operating reference pH and monitoring said pH to determine when said pH returns to and remains substantially at said operating reference pH.

29. A method for removing dinitrogen pentoxide deposits from an ozone generator, said generator comprising:
   a) an outer housing and a plurality of support tubes mounted within said housing;
   b) said support tubes each supporting therein one or more dielectrics;
   c) each of said support tubes having an inner wall and a passageway between said inner wall and said one or more dielectrics;
   d) said passageway communicating between a support tube inlet and a support tube outlet; and
   e) a shell surrounding said support tubes, said shell defining an interior surrounding said support tubes;
   f) said interior communicating between a shell inlet and a shell outlet;
   g) said method comprising circulating a clean, dry mixture of oxygen, nitrogen and argon at 55° C.–60° C. between said shell inlet and shell outlet;
   h) supplying said shell with warm water at 55° C.–60° C.;
   i) diverting a portion of the gas exiting said support tubes to a liquid ring compressor;
   j) adding a neutralizing agent to the water in said compressor to maintain the pH in said liquid ring compressor at an approximately constant pH using an in-line process pH controller; and
   k) continuing said cleaning until the addition of neutralizing agent terminates as it is no longer required to maintain said constant pH.

30. A method of cleaning an electrical discharge ozone generator comprising ceasing the production of ozone in the ozone generator and then passing a warm cleaning gas between an inlet of said generator and an outlet of said generator to evaporate at least some of the $NO_x$ deposited in said ozone generator.

31. A method as claimed in claim 30 wherein said warm cleaning gas exits said ozone generator at a temperature at said outlet sufficient to maintain the $NO_x$ in a gaseous state until said $NO_x$ exits said ozone generator.

32. A method as claimed in claim 31 wherein said cleaning gas consists substantially of oxygen gas.

33. A method as claimed in claim 30 wherein said $NO_x$ includes $N_2O_5$.

34. A method as claimed in claim 31 wherein said cleaning gas is warmed to between 47° C. to 65° C. for cleaning said ozone generator.

35. A method of cleaning an electrical discharge ozone generator having an interior chamber, said method comprising passing through said interior chamber a warm cleaning gas heated to between 47° C. to 65° C. to evaporate at least some of the $NO_x$ deposited in said interior chamber.

* * * * *